Figure 1:
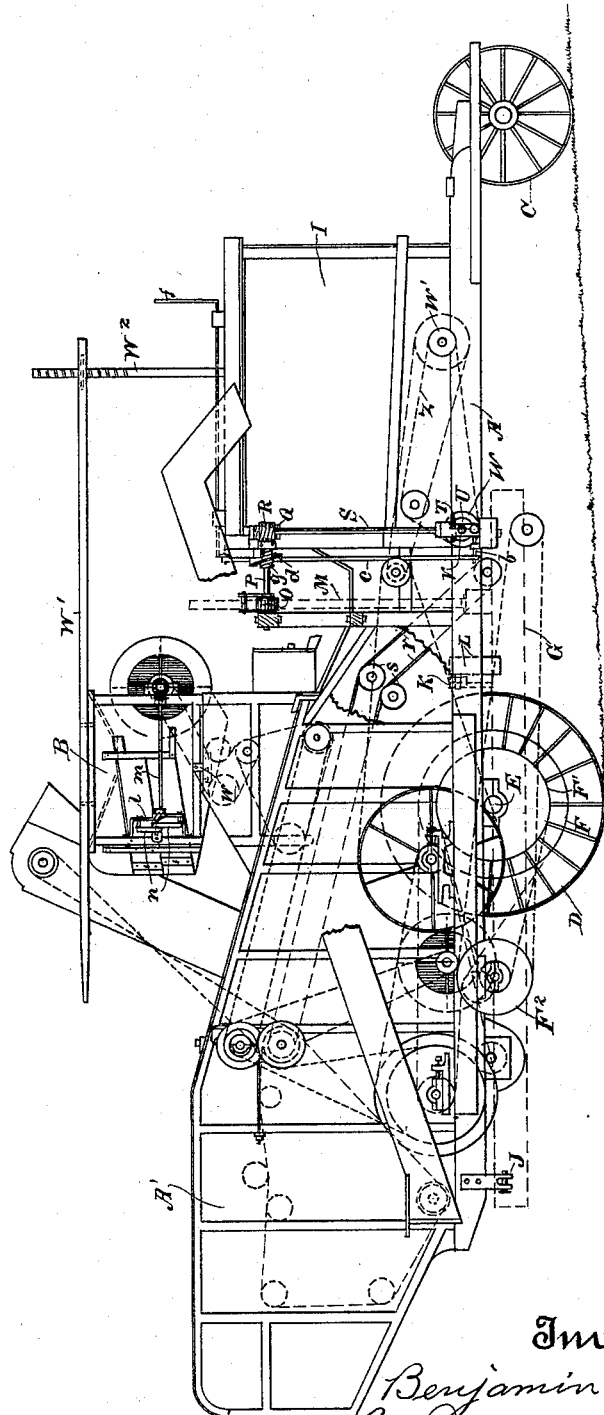

(No Model.) 3 Sheets—Sheet 1.

B. HOLT.
COMBINED HARVESTER.

No. 596,446. Patented Dec. 28, 1897.

Witnesses,

Inventor
Benjamin Holt.
By Dewey & Co.
Attys

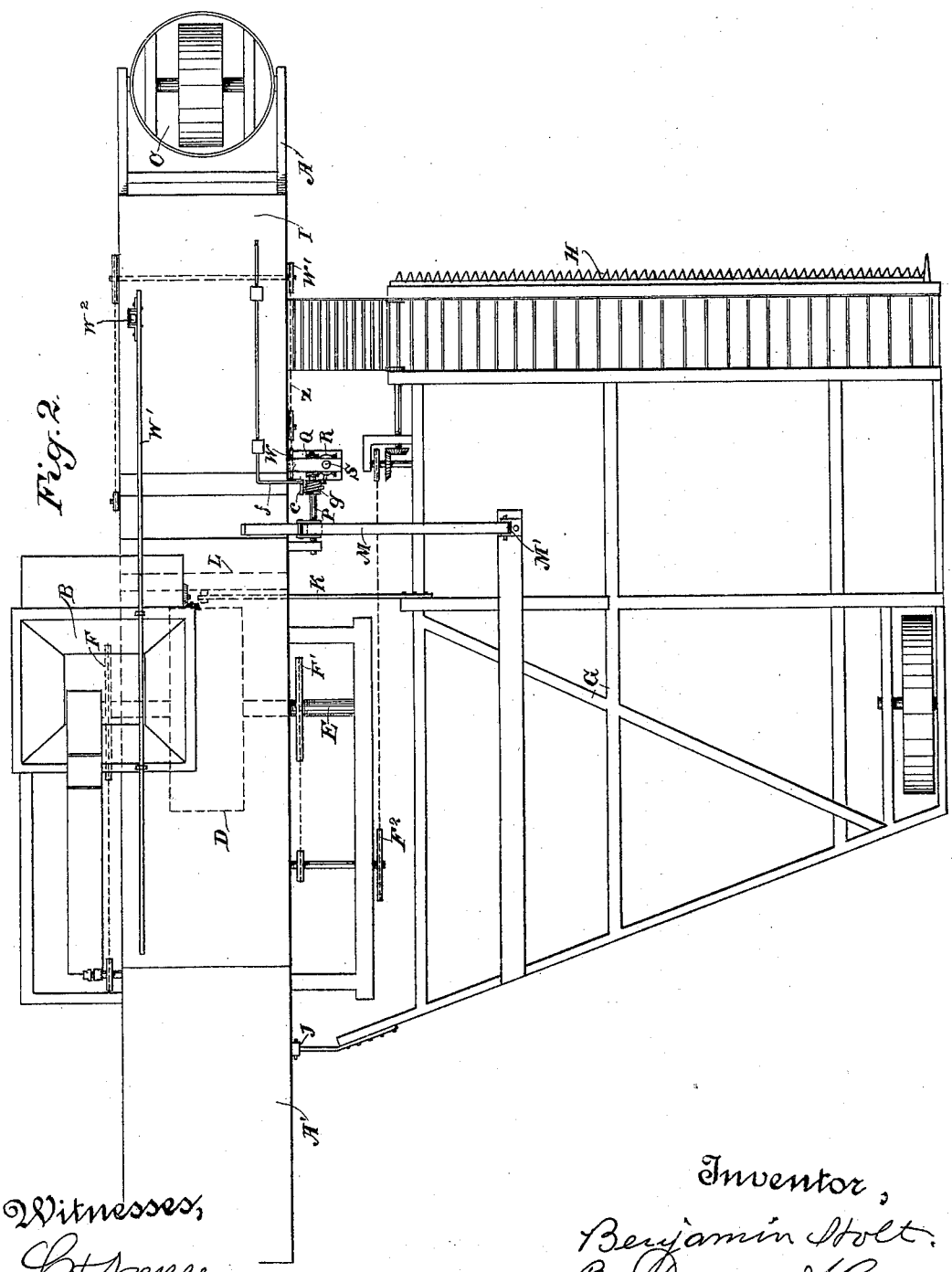

(No Model.) 3 Sheets—Sheet 3.
B. HOLT.
COMBINED HARVESTER.
No. 596,446. Patented Dec. 28, 1897.
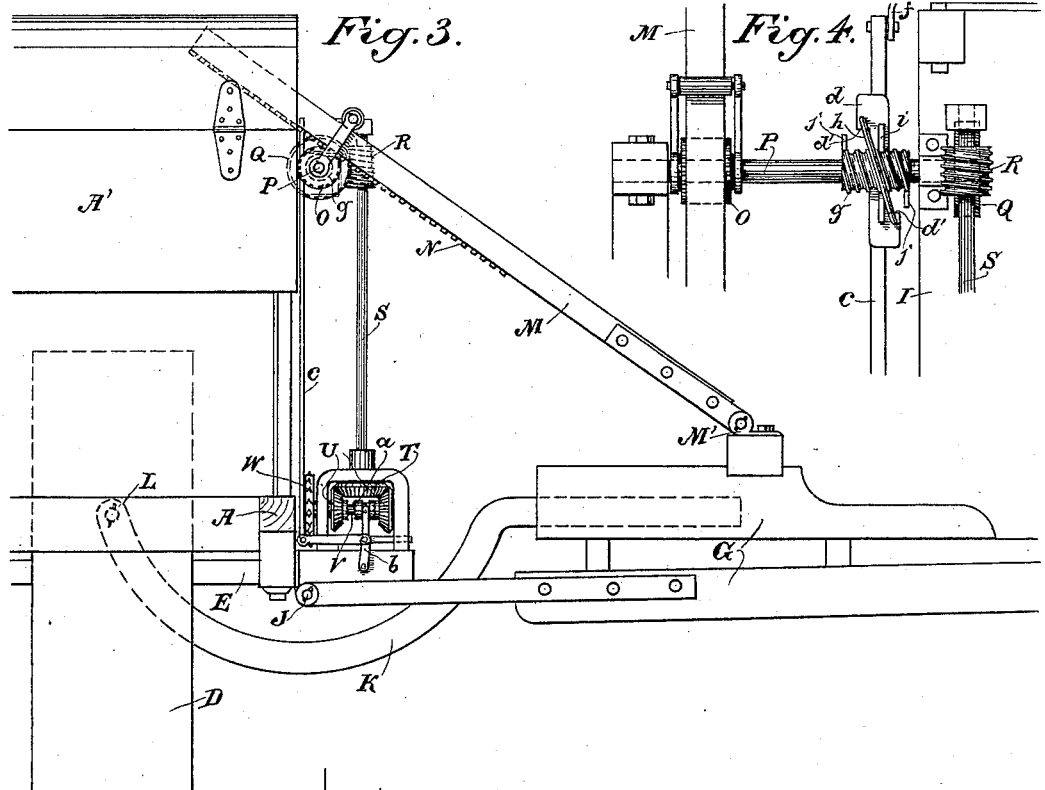
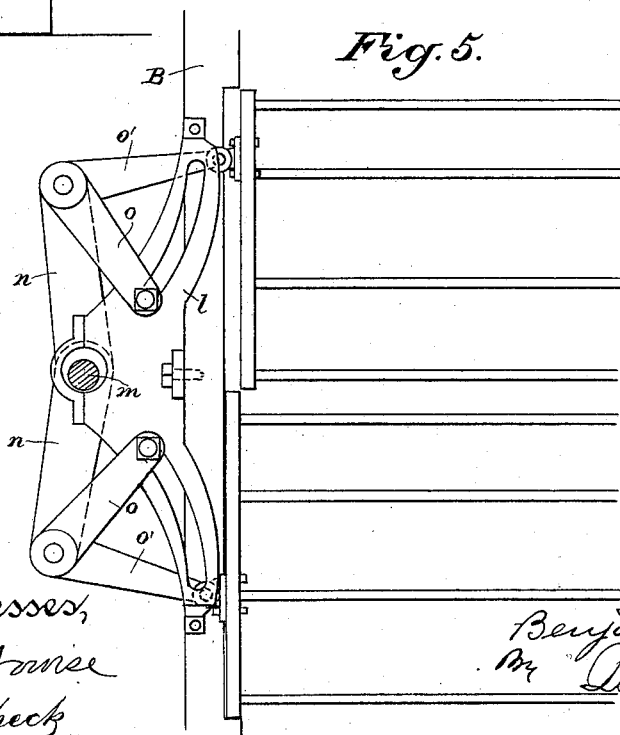
Witnesses:
Inventor,
Benjamin Holt

UNITED STATES PATENT OFFICE.

BENJAMIN HOLT, OF STOCKTON, CALIFORNIA.

COMBINED HARVESTER.

SPECIFICATION forming part of Letters Patent No. 596,446, dated December 28, 1897.

Application filed November 25, 1895. Serial No. 570,012. (No model.)

*To all whom it may concern:*

Be it known that I, BENJAMIN HOLT, a citizen of the United States, residing at Stockton, county of San Joaquin, State of California, have invented an Improvement in Combined Harvesters; and I hereby declare the following to be a full, clear, and exact description of the same.

My invention relates to an apparatus for the cutting, threshing, separating, and cleaning of grain in a continuous process by means of a machine which is adapted to travel over the field while carrying on the operation.

It consists of the parts and the constructions and combinations of parts hereinafter described and claimed.

Figure 1 is a side elevation of the grain side of the machine, the header being removed. Fig. 2 is a plan view of the whole machine. Fig. 3 is a rear view of the machine, showing the manner of connecting the header to the machine and also the tilting mechanism. Fig. 4 is a detail of the automatic tilting device. Fig. 5 is a view of the variable shaking attachment for the cleaner-shoe.

Traveling harvesters consist of a large triangular horizontally-disposed frame upon the front of which is operated a long reciprocating cutter-bar by which the grain is reaped. Behind this is a horizontally-traveling belt or draper upon which the grain falls and which carries it toward and delivers it to the threshing-machine, to the side of which the header-frame is hinged. The outer end of the header-frame is supported upon a single bearing-wheel.

The threshing-machine has usually two bearing-wheels upon opposite sides and a steering-wheel in front, so that it travels upon three points of support. These bearing-wheels of necessity follow the irregularities of the ground, and whenever the surface is inclined, as upon hillsides, the threshing-machine will be thrown out of level, so as to greatly interfere with the work of threshing and cleaning.

The object of the present invention is to make a single-track machine of the threshing portion by the use of a single centrally-disposed bearing-wheel in connection with the steering-wheel at the front, and to so connect the threshing-machine and the header-frame with intervening mechanism that the threshing-machine frame may be tilted to one side or the other upon its wheel-base as the header-frame inclines up or down the hillside, whereby the threshing-machine frame may be maintained at all times in an approximately horizontal position.

A is the frame of a threshing-machine, having fixed upon it the superstructure A', which contains the threshing-cylinder, the belt extending rearwardly therefrom which carries the grain and threshed straw, and the shoe and screens by which the grain is primarily separated from the chaff and straw, and upon one side thereof is mounted the cleaning attachment B, into which the grain is elevated and by which it is finally cleaned ready for sacking. This threshing-machine frame is supported by two wheels approximately in line with each other and on the line of travel of the machine. The wheel C at the front is the ordinary steering-wheel, which is adapted to turn from side to side and is operated in the usual manner of such steering-wheels. The other wheel D is the main bearing-wheel and is mounted upon a shaft E, which is journaled across the threshing-machine frame at a point sufficiently behind the steering-wheel and near to the center of the machine, so that the principal part of the weight of the thrashing-machine frame is borne upon this wheel. This wheel may be provided with the usual projecting angle-iron ribs around the periphery of its rim, which take hold of the ground and thus prevent it from slipping, so that the wheel will have sufficient tractile force to drive the threshing and cleaning machinery and also to drive the cutter and draper of the heading machinery.

The shaft E extends sufficiently to each side of the threshing-machine frame so that one chain sprocket-wheel F, fixed upon one end of the shaft, serves, through suitable sprocket-wheels and chains, to drive the threshing machinery, while the other sprocket-wheel F', mounted upon the opposite end, serves in like manner to drive the machinery of the header. By thus driving from both ends of the shaft the power is more evenly balanced and the side strain is reduced.

The header-frame G, which extends outwardly to the right of the threshing-machine, carries upon its front the usual cutter-bar and sickle at H and behind this a transversely-traveling draper or carrying-belt, by which the grain which falls upon it from the sickle is transferred and through an intervening header-spout is delivered into the feeding-house I upon the threshing-machine frame, from which it is delivered to the threshing-cylinder in the usual well-known manner. (Not here shown.)

The header-frame has its rear end hinged to the rear of the threshing-machine frame, as shown at J, and the front portion of the header-frame is hinged to the threshing-machine frame by a strong curved yoke K, one end of which is securely bolted to the header-frame, and the other end, curving beneath the lower sill of the threshing-machine frame, extends upwardly at a point approximately in a central line just in front of the bearing-wheel D, where it is pivoted to a transverse timber of the frame, as shown at L. It will be manifest that the rear hinge J might also be centrally disposed upon the threshing-machine frame; but the distance between the two is so great in actual practice that I have found it not necessary to make this hinge connection central and have therefore for convenience attached it to the side of the threshing-machine in the usual manner. By carrying the yoke K to a central point, however, it is possible to tilt the threshing-machine frame about the line passing through these two hinges, so as to at all times adjust it with relation to the outwardly-extending header-frame when the latter is inclined either upwardly or downwardly upon a sidehill, and the threshing-machine frame can thus be maintained in an approximately horizontal position whatever may be the position of the header-frame. In order to connect and operate these two hinged frames with precision, I have shown a bar or shaft M extending diagonally from the header-frame, to which it is secured at the lower end by a hinge-joint, as shown at M'. By lengthening or shortening this connection between the header and the threshing-machine the latter is tilted to one side or the other. Various devices may be used for this purpose. In the present case I have illustrated it in the form of a rack-bar. The upper end of this bar has fixed to its lower side a rack N, and this rack engages with a pinion O, fixed upon a horizontal shaft P, journaled upon the side of the threshing-machine, as shown. Upon this shaft P is fixed a worm-gear Q, and this engages the worm R, which is fixed upon a vertical shaft S, suitably journaled upon the threshing-machine, as shown. The lower end of this shaft has fixed upon it a bevel-wheel T, through which power is transmitted for the purpose of rotating it in either one direction or the other to operate the worm-gear to rotate the shaft P and thus move the bar M. This movement of the bar M by reason of its lower end being firmly connected with the header-frame will tilt the threshing-machine frame about its narrow wheel-base to any desired extent.

In order to rotate the shaft S and bevel-wheel T, I have shown pinions U, mounted upon a shaft V, which extends beneath the bevel-wheel T, so that these pinions engage opposite sides of the wheel T. The shaft V has upon its outer end a sprocket-wheel W, which is driven by a chain Z passing around it and another sprocket-wheel W'. This latter sprocket-wheel is fixed upon the shaft, which is driven by connection with the threshing-cylinder shaft upon the opposite side of the machine or from other suitable moving part of the machinery. The bevel-gears U turn loosely upon the shaft V, and either of them is caused to engage with and drive the bevel-wheel T by means of a clutch $a$, which is slidable upon the shaft V, and when caused to engage one of the beveled pinions it connects it with the shaft V, while the other one turns loosely, and the driving-pinion communicates motion to the bevel-wheel T and vertical shaft S to rotate in one direction. When the clutch has disengaged from this pinion and moved to the other side to engage the other pinion, the bevel-gear and vertical shaft are rotated in the opposite direction. The clutch mechanism is of the usual form of such clutches and not especially novel in itself.

In order to limit the tilting of the threshing-machine frame when started in either direction, I have shown an automatic disengaging device, which consists of a bell-crank lever $b$, one arm of which is permanently fulcrumed, and the angle is connected with the clutch $a$ just described, or the angle may be fulcrumed and the movable arm connected with the clutch, if preferred. The other arm of the bell-crank lever is connected by a rod $c$ with a vertically-moving plate $d$. The upper end of this plate has connected with it a lever $f$, which extends to a point within reach of the operator on the front of the machine. By means of this lever the operator may move the plate $d$ and the connecting-rod $c$, so as to throw either clutch into engagement with the bevel-gear and thus start the machine to tilting when the header reaches the inclined surface over which it is passing.

In order to prevent the machine from being tilted too far in case the operator neglects to disengage the clutch at the proper time, I have shown a mechanism which consists of a worm $g$, the shaft of which is journaled to the side of the machine, and the threads of this worm are sufficiently separated to admit the vertical arm of a rectangular yoke $h$, the ends of which yoke are fixed to the plate $d$. Upon the plate $d$ is a projecting guide-tongue $i$, which also enters the space between two of the threads of the worm adjacent to the ones between which the yoke $h$ lies. The plate $d$ is formed with offsets, as shown at $d'$, one upon each side, one being adapted for engagement to move the plate up and the other to move it down. Upon the outer ends of the screw or worm G are fixed the lugs *j*. These lugs project so far that when the worm is in position so that one of the lugs is in line with the shoulder or offset *d'* it will strike this offset and thus move the plate *d* up or down, as the case may be, so as to operate the bellcrank lever *b* and move the clutch.

The operation will then be as follows: When the lever *f* has been moved so as to throw one of the clutch-pinions U into engagement with the bevel-wheel T, the latter, with its shaft S and worm-gear R, will be rotated, and the shaft P will also be turned by it, and through the pinion O it will act upon the rack N and bar M, and, as before stated, will tilt the threshing-machine frame to one side or the other. If the operator fails to disengage the mechanism at the proper time, it will be automatically disengaged by means of this mechanism of the worm *g*, just previously described. This worm being fixed upon the shaft P will be rotated by it, and there are turns enough to the screw or worm to allow the shaft P to be rotated as many times as will be necessary to tilt the threshing-machine frame to its extreme limit in either direction. It will be seen that as the worm or screw *g* turns the guiding-tongue *i* upon the plate *d* will cause it to move longitudinally, and it moves in this manner until the projecting lug *j* is in line with the shoulder *d'* of the plate *d*, when a further revolution of the screw *g* causes it to strike the shoulder *d'* and thus push the plate *d*, and through the connecting-rod *c* it actuates the bell-crank lever *b* and disengages the clutch. If the clutch is engaged so as to tilt the threshing-machine frame in the opposite direction, the same operation occurs by reason of the lug *j* upon the opposite end of the screw *g*. The yoke *h* is long enough to allow vertical movement of the plate *d*, and when either of the lugs *j* strikes its shoulder *d'* the movement of the plate *d* either up or down, as the case may be, will carry the shoulder out of engagement with the lug, so that when the screw is rotated in the opposite direction it will not engage or prevent it from rotating. The cleaner B has that portion which carries the shoes mounted upon a hinge-joint *w*, so that it may be tilted either forward or back and thus maintain the shoe and the cleaning-screens at the proper angle for cleaning in case the machine is going directly up or down hill.

W' is a lever-arm fixed to the cleaner B and extending above the threshing-machine to a point within reach of the operator. This arm is made to engage with a vertical rack $W^2$, and the cleaner may thus be adjusted and kept approximately level in the direction of travel independent of the movements of the threshing-machine in that direction. The level from side to side will be maintained by the adjustment of the threshing-machine, as previously described. The shake of the shoe is increased or diminished as the machine moves slowly or rapidly, as in ascending or descending hills.

Various devices may be employed to lengthen or shorten the stroke, but I have found the following very effective. In order to regulate the shake of the shoe, I have shown a mechanism which consists of a double-curved slotted yoke *l*, fixed to the side of the cleaner-case. Through the apex or meeting points of the two curved portions *l* passes a shaft *m*, having an eccentric portion to which are connected the pitmen *n*. The opposite ends of these pitmen are connected with two other rods or pitmen *o* and *o'*. The pitman *o'* is connected with the shoe which it drives, the upper pitman being connected with the upper shoe and the lower one with the lower shoe. The other arm, *o*, pivotally connects with the slotted yoke *l* by means of a pin or bolt passing through the slot in the yoke, and by loosening this nut it may be moved over so as to stand exactly in line with the pitman *o'* or at the greatest distance from it allowed by the slot. When it stands in line with the pitman *o'*, there will be no movement of the upper shoe, as the fulcrum or fixed point of the arm *o* is essentially the same as the connection of the pitman *o'* with the shoe. As it is moved away from the pitman *o'* the movement of the pitman and the shoe is increased until it is at its greatest distance, when the maximum motion of the shoe is produced. By this construction it will be seen that the amount of shake of either of the shoes of the cleaner can be regulated independent of the other and any desired amount of shake can be given to either or both the shoes while the machine is in motion to accommodate the amount and condition of the grain that is brought to the cleaner and the speed at which the machine is traveling. This regulation is especially valuable when working upon undulating ground, as the speed of the machine is much slower when going uphill, and the shake can then be increased, and it can be decreased when the machine is moving faster.

By extending the main wheel-shaft E to the outside of the machine the sprocket-wheels F F' may be secured to the outer ends of this shaft, and all driving-chains and connections are thus made exterior to the case and convenient of access. This construction also enables me to set the machine much lower than if the sprockets were fixed to the wheel or within the case, as the latter construction would make it necessary to raise the machine considerably to make room for the driving-chains and clear the fan-case and other interior parts, and would decrease its stability.

The grain-carrier belt *r*, conveying from the threshing-cylinder to the rear of the machine and the cleaning-shoe, inclines upwardly at a sharp angle for a short distance from the cylinder, then passing over direction-pulleys *s* its direction is changed to a more nearly horizontal position. By this change of direction the line of the first portion of the belt from the cylinder would, if continued, strike the top of the case, which is provided with a suitable metal shoe to prevent wear. The grain which is thrown forcibly from the cylinder and concave is thus directed along the line of this sharply-inclined portion of the belt and, striking the top of the case, will fall back on the more nearly horizontal portion, by which it is conveyed to the point where it is delivered to the cleaning-shoe at the rear. The straw and chaff are carried upwardly and backwardly by the belt in the usual manner and delivered from the rear of this belt to a straw-carrier extending rearwardly to a point of delivery where the straw is discharged. The advantage in this construction is, first, that I am enabled to carry this belt above the centrally-located bearing and driving-wheel without carrying the rear end too high and thus increasing the height of the machine. The second advantage is that the grain, which is discharged with considerable velocity from the concave, is not thrown far back to the rear of the machine, as would be the case if it were discharged in a direct line, but is thrown upward against the interior of the case, and its velocity being thus checked it falls back upon the belt and is then conveyed to its destination. The distance from the sprocket-wheel $F^2$, which furnishes power to drive the sprocket-pinion on the header, is so great by reason of its position that a long chain is used to connect the two, and this allows enough twist in the chain to conform to the changes of angle between the header and thresher without deranging the action of the chain.

It will be seen that by the use of the two wheels essentially in line beneath the thresher and the wheel at the outer end of the header-frame I have but three points of support for the whole structure. This allows it to adjust itself readily to any changes in the conformation of the ground, and if the machine is to be used in a nearly or quite level country the header and thresher frames may be rigidly united and the mechanism for leveling the threshing-machine frame may be dispensed with.

Having thus described my invention, what I claim as new, and desire to secure by Letters Patent, is—

1. In a combined harvester, a threshing and cleaning mechanism, a single centrally-journaled bearing-wheel and a front steering-wheel approximately in line therewith upon which the machine is supported, a header-frame having a bearing-wheel at the outer end, an arm extending inwardly from the header-frame and pivoted in front of and approximately in line with the bearing-wheel, and a second hinge connecting the rear of the frame with the rear portion of the threshing-machine, in combination with an inclined arm having the lower end hinged to the header-frame and the upper end connected with a mechanism whereby it may be lengthened or shortened with relation to its connection with the header, and the threshing-machine correspondingly tilted to one side or the other.

2. In a combined harvester, the header-frame having the outer ends supported upon a bearing-wheel, a threshing-machine frame having a centrally-journaled bearing-wheel and a steering-wheel approximately in line therewith at the front, hinged arms whereby the header-frame is connected with the threshing-machine frame in a line which extends approximately through the center of the threshing-machine frame, a rack-bar hinged to the header-frame extending diagonally across the upper part of the threshing-machine, a shaft journaled upon the threshing-machine frame, a pinion fixed upon the shaft engaging the teeth of the rack-bar and a mechanism whereby the shaft may be rotated so as to move the rack-bar and tilt the threshing-machine upon its wheel-base in either direction with relation to the header-frame.

3. In a combined harvester, a header-frame and threshing-machine hinged together upon a line approximately central longitudinally through the threshing-machine frame, a single bearing-wheel upon which the outer end of the header-frame is supported, a single bearing-wheel journaled centrally beneath the threshing-machine frame, and a steering-wheel in front approximately in the same line of travel with the bearing-wheel a rack-bar hinged at one end to the header-frame extending diagonally across the threshing-machine, a pinion fixed upon a horizontally-rotatable shaft and engaging the rack-bar, a second pinion fixed upon the said shaft engaging with a worm or screw upon a vertical shaft journaled to the side of the threshing-machine, and gearing whereby said shaft is rotated in either direction to act upon the rack-bar and tilt the threshing-machine to one side or the other with relation to the header-frame.

4. In a combined harvester, the header-frame and the threshing-machine frame hinged together in a line which passes approximately through the center of the threshing-machine frame, a single bearing-wheel by which the outer end of the header-frame is supported, a bearing and a steering wheel approximately centrally journaled with relation to the threshing-machine frame, a rack-bar having the lower end hinged to the header-frame, the opposite end extending across the threshing-machine, a pinion fixed to a horizontally-rotatable shaft engaging the rack-bar so that rotation in either direction will lengthen or shorten the rack-bar and correspondingly tilt the threshing-machine frame upon its wheel-base with relation to the header-frame, a second pinion fixed to the rotatable shaft, a worm-gear or screw fixed to a vertical shaft and engaging said pinion, a bevel gear-wheel fixed to its lower end and pinions engaging opposite sides of said gear with a clutch-coupling whereby either of said pinions may be thrown into or out of engagement so as to reverse the rotation of the gear and the connected shafts.

5. In a combined harvester, a header-frame and a threshing-machine frame hinged together on a line approximately through the center of the threshing-machine frame, a bearing-wheel upon which the outer end of the header-frame is supported, a single bearing-wheel journaled approximately central beneath the threshing-machine, and a steering-wheel in line therewith upon which the front end of said frame is supported and a rigid shaft or bar, the lower end connected with the header-frame and the upper end extending over the upper part of the threshing-machine, and a mechanism whereby said bar may be lengthened or shortened with relation to its attachment to the header-frame, and the threshing-machine frame tilted to one side or the other.

6. In a combined harvester, a header-frame and threshing-machine frame hinged together upon a line central with the threshing-machine frame, as shown, a single bearing-wheel upon which the outer end of the header-frame is supported, a bearing and steering wheel in line beneath the central portion of the threshing-machine upon which it is supported and about which it may be tilted with relation to the header-frame, a mechanism consisting of a bar connected with the header-frame extending over the threshing-machine, and means whereby said bar may be lengthened or shortened to tilt the threshing-machine upon its wheel-base to one side or the other with relation to the header-frame, a mechanism by which said operation is effected and a means for ultimately disengaging said mechanism and throwing it out of gear.

7. A header and a threshing-machine frame hinged together, said threshing-frame supported upon a single line of bearing-wheels, a bar hinged to the header-frame extending across the threshing-machine frame, a pinion engaging said bar and mounted upon a horizontally-rotatable shaft, a mechanism by which said shaft is rotated in one direction or the other, a clutch-coupling whereby the reversal of motion is effected, a bell-crank lever by which said coupling is actuated to engage and operate the gearing in either direction, a rod connecting therewith, a plate having offsets upon opposite sides, a worm-gear revolving horizontally across the front of said plate, a guiding-tongue extending from the plate between the threads of the worm whereby the latter travels to one side or the other with relation to the plate, and lugs projecting from opposite ends of the worm adapted to engage either one or the other of the offsets when the worm has reached the end of its travel, whereby the clutch-lever is actuated to throw its pinion out of gear.

8. In a combined traveling harvester, a connected header, and thresher and separator, a cleaning mechanism hinged transversely upon the upper part of the threshing-machine, and capable of a movement about its hinge in the direction of travel of the machine only, an arm fixed to the cleaner extending at right angles with the hinge and a locking device with which it engages.

9. In a combined harvester, a cleaning mechanism having oscillating shoes containing cleaning screens and sieves, pitmen extending from said shoes outwardly, connecting-rods extending from the outer ends of the pitmen to an eccentric-shaft by which they are actuated, and brace-rods extending from the meeting angle of the pitmen and connecting-rod to a stationary adjustable support about which the motion takes place and by which the extent of the throw is regulated.

10. In a combined harvester, in which the threshing-machine has a single line of bearing-wheels, a mechanism flexibly connecting the header and thresher, whereby the header is tilted independently about a single axial line extending longitudinally within the line of the threshing-machine frame.

11. In a combined harvester, a threshing-machine with a single line of bearing-wheels longitudinally disposed with relation to it, a header having a wheel-support for its outer end, and a flexible connecting mechanism between the thresher and the header, whereby the latter may be adjusted about a longitudinal axial line interior to the threshing-machine.

12. A harvester consisting of a header supported substantially parallel with the ground, a thresher mounted on a single longitudinal line of wheels, connections between the header and thresher frames to permit them to change their positions relative to each other and means for adjusting the thresher relative to the header so that it may maintain a horizontal position without regard to the position of the header when traveling over sloping ground.

In witness whereof I have hereunto set my hand.

BENJAMIN HOLT.

Witnesses:
ELIHU B. STOWE,
GEO. H. COWIE.